No. 683,403. Patented Sept. 24, 1901.
M. HYMAN.
BANK DRAFT.
(Application filed Apr. 6, 1901.)
(No Model.)
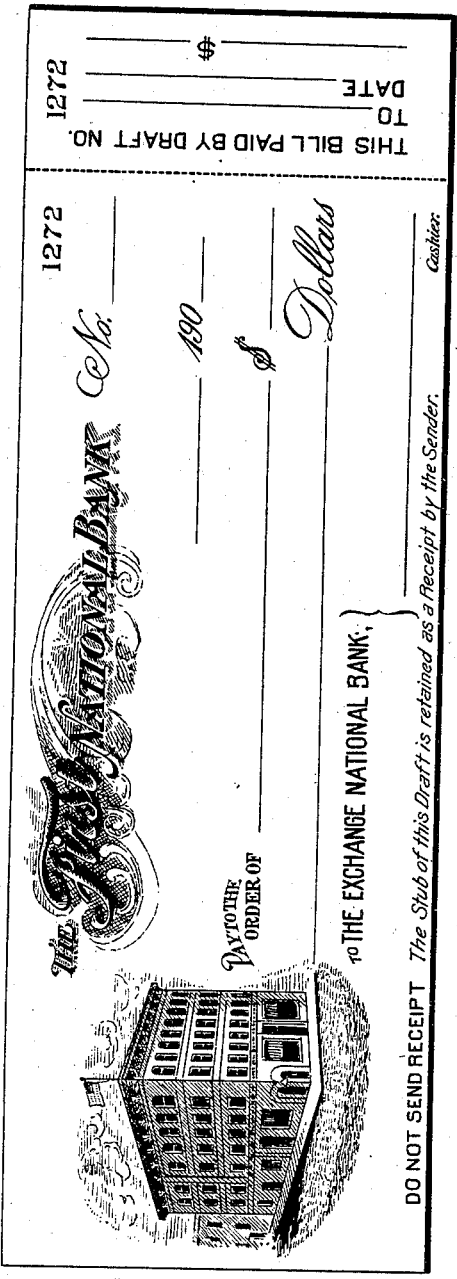
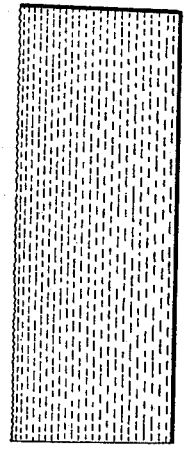
WITNESSES:
INVENTOR.
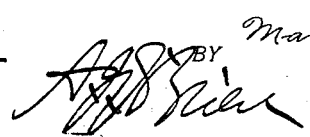
ATTORNEY.
THE NORRIS PETERS CO., PHOTO-LITHO., WASHINGTON, D. C.

UNITED STATES PATENT OFFICE.

MANIE HYMAN, OF DENVER, COLORADO.

BANK-DRAFT.

SPECIFICATION forming part of Letters Patent No. 683,403, dated September 24, 1901.

Application filed April 6, 1901. Serial No. 54,748. (No model.)

*To all whom it may concern:*

Be it known that I, MANIE HYMAN, a citizen of the United States of America, residing at Denver, in the county of Arapahoe and State of Colorado, have invented certain new and useful Improvements in Bank-Drafts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in bank-drafts and similar instruments employed in the payment of bills by mail.

My object is to render it unnecessary for the receiver of the draft to send an acknowledgment thereof or receipt therefor to the remitter. A draft of this character would be a source of economy to all houses, firms, and others accustomed to receive remittances by mail; but the great saving would be to large wholesale dealers accustomed to receive perhaps a thousand drafts per day from as many different customers. A receipt or acknowledgment forwarded to each sender of a draft means, considering postage-stamps, stationery, and clerk hire, an item of expense to the house amounting to fifty dollars a day. My object is, as before intimated, to save this entire item of expense.

My improved draft is provided with a coupon containing data referring to the bill or invoice paid by the draft, which is also identified by the coupon. There is a perforated line between the coupon and the body of the draft to facilitate its removal previous to forwarding. This coupon is also gummed on the back to facilitate attaching it to the bill or invoice paid by the draft. The body of the draft contains a reference to the coupon and instructions for the receiver of the draft to the effect that he need not send a receipt.

The accompanying drawings illustrate my invention.

Figure 1 is a face view of the complete draft; and Fig. 2 is a back view of the coupon detached, showing the gummed surface.

The coupon is located at the right-hand extremity of the draft, a perforated line being formed between it and the body of the draft. In the drawings the shading in Fig. 2 is intended to designate the gum on the back of the coupon. While the coupon-back is shown gummed over its entire surface, it is evident that the gum need be only applied to a portion thereof in order to subserve the required function. This coupon contains the same number as the draft and in addition to this the following data: "This bill paid by draft No. —," blanks being left for the name of the remitter, the date of the draft and bill, and for the amount. The body of the draft contains the following instructions: "Do not send receipt; stub (or coupon) of this draft retained as receipt by the sender." Before placing the draft in the envelop to be mailed the coupon is torn off and stuck upon the bill paid by the draft, the back of the coupon being gummed, as before stated, for this purpose.

Having thus described my invention, what I claim is—

1. A bank-draft or similar instrument employed in the payment of bills by mail, said instrument being provided with a detachable coupon containing data referring to the bill paid by the draft, and also data identifying the draft, the body of the draft containing data referring to the object of the coupon and containing instructions for the receiver of the draft.

2. A bank-draft or similar instrument, having a detachable coupon gummed on the back and containing on its face, data referring to the bill or invoice to be paid by the draft, and data identifying the draft, the body of the draft containing data referring to the object of the coupon and containing instructions for the receiver of the draft.

In testimony whereof I affix my signature in presence of two witnesses.

MANIE HYMAN.

Witnesses:
 DORA C. SHICK,
 MARY C. LAMB.